Nov. 23, 1965  SHIGEMITSU FUJINUMA  3,219,355
TOOL HOLDER

Filed Oct. 4, 1963  5 Sheets-Sheet 1

Shigemitsu Fujinuma
INVENTOR.

BY Wenderoth, Lind
and Ponack,
attorneys

United States Patent Office 3,219,355
Patented Nov. 23, 1965

3,219,355
TOOL HOLDER
Shigemitsu Fujinuma, Utsunomiya-shi, Tochigi-ken,
Japan, assignor to Kyoritsu Seiki Kabushiki
Kaisha, Tochigi-ken, Japan
Filed Oct. 4, 1963, Ser. No. 314,018
Claims priority, application Japan, Oct. 30, 1962,
37/48,231
2 Claims. (Cl. 279—75)

This invention relates to a tool holder, particularly to a holder for metal cutting tools, which is used for attaching a cutting tool or a tool adapter to a main driving spindle or other driving members.

A method utilizing cam motion or screw engagement has been commonly adopted for fixing a tapered tool holder in a tapered socket of the driving spindle or the like.

The tool holder must be firmly fixed within the main spindle to assure proper driving of the tool. Therefore, even when a non-sticking taper angle is used, the tool holder is always pushed firmly into the tapered socket, and it is necessary to knock the holder out of the socket by the use of a hammer or to use a drift pin to get said tool holder out of the socket. This knocking on the tool or holder with a hammer tends to impair the accuracy of the main spindle of a machine or tool holder. Further, this kind of fixing means requires, in mounting and dismounting of the tool holder, considerable skill on the part of the workmen and a long time for replacement, and the accuracy depends upon the caution taken by the worker. Thus such fixing means as described above has not been considered satisfactory.

It is the main object of this invention to provide a novel and improved means for mounting a tool holder on the main spindle in such a way that the tool holder is most firmly and accurately fixed and is easily and quickly taken off without requiring any great skill on the part of the worker and without damaging the machine or the common members.

It is another object of the invention to provide a tool holder which saves greatly the time required for mounting and dismounting of the tools independently of the skill of the workmen and enables such mounting and dismounting to be carried out with promptness and ease without any danger of injuring machine members. So the present invention is particularly advantageous where the tool must be replaced repeatedly.

It is still another object of the invention to provide a novel means for fixing, releasing and dismounting of a tool holder, characterized by the cooperation of spiral slots and driving steel balls by which the tool holder is fixed when a driving nut is rotated in one direction and is dismounted when the nut is rotated in an opposite direction and is shifted axially of the device.

It is a further object of the invention to provide a mechanism such that by rotating the driving nut in one direction the tool holder is fixed and by rotating the same in an opposite direction, the tool holder is loosened without any danger that the holder will fall due to gravity and damage itself, the tool or the work-piece because the tool holder is held in position by an engaged relationship between the tool holder and the driving balls, and further the tool holder may be dismounted easily by shifting the position of the driving nut to disengage the holder from the balls.

It is a still further object of the invention to provide an improved mechanism, which can be made with relatively low cost, fulfilling the desired purpose and suitable for practical use.

Other objects and advantages of this invention will be understood from the following detailed description taken in connection with the accompanying drawings, in which FIG. 1 is a sectional axial view of a tool holder device according to the present invention showing the tool holder fixed within a tapered socket of the spindle by means of the fixing mechanism according to this invention;

Figure 1:
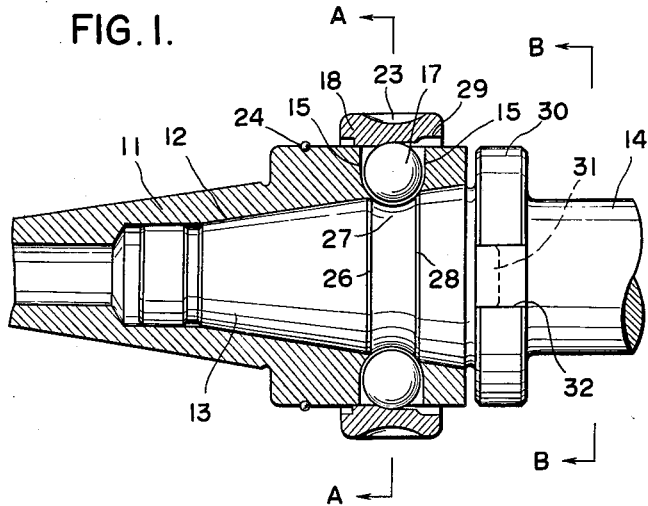
Figure 2:
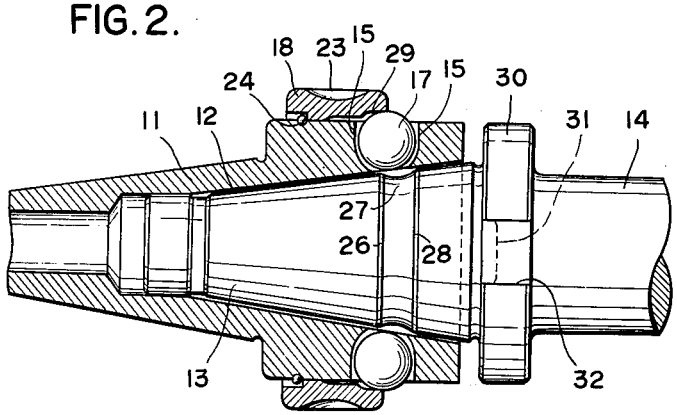
FIG. 2 is a view similar to FIG. 1 of the tool holder with the driving nut rotated and shifted so as to loosen and permit removal of the tool holder.

A tool spindle or a driving member shown generally by 11, there is provided a tapered socket 12, which holds a tapered end 13 of a tool holder 14. The member 11 may be the driving spindle or a means to join the tool holder to the driving spindle.

When a machining tool is positioned in the driving member 11, the tapered socket 12 and the tapered end 13 of a tool holder are made in accordance with Japanese industrial standard, JIS B–6102, and their tapering angle is designed in a non-sticking manner. However, the solidity and firmness of the contact between these tapered parts, particularly when the tool holder is pushed into the tapered socket by undue force, makes the dismounting of the holder difficult unless a hammer or drift pin is used therefor.

The mechanism of tool holder in this invention is not limited to any special tapering angle such as described above.

As shown in FIG. 3, FIG. 4, FIG. 5 and FIG. 7, spiral slots 15 are provided in the driving member 11 at an angle of $\theta°$ so that the spiral slots cross over a groove 27 formed in the tapered socket 12 and the driving steel balls 17 are supported by the inwardly extending portions 16 at the inner part of the slots so as not to drop into the socket 12. The steel driving balls 17 are rotatably held within the spiral slot 15.

Figure 7:
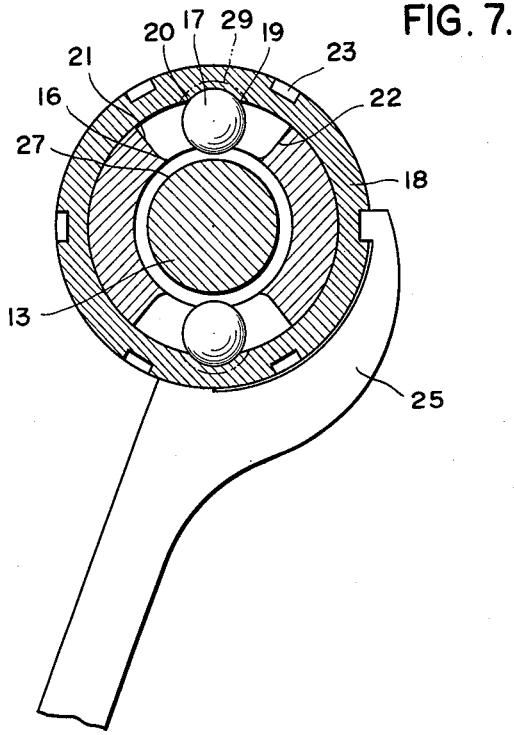

These driving balls 17 may be, as shown in FIG. 7, rotated and shifted within the spiral slots 15 being driven by the driving faces 19 and 20 of a groove in the internal peripheral surface of the driving nut 18, and their movements along the length of the slots are limited by end faces 21 and 22.

A stop ring 24 is provided on the driving member 11 so as to limit the movement of the driving nut 18 in the direction parallel to the axis of spindle.

Notches 23 for hook wrenches are provided around the periphery of the driving nut 18, which help the workmen rotating the driving nut 18 in one direction or in an opposite direction to fix or to take out the tool holder 14.

Figure 3:
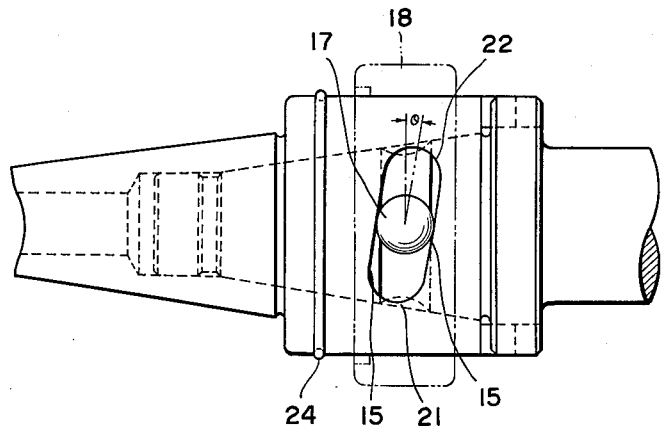
FIG. 3 is a side view of the tool holder device of FIG. 1, partly shown with the driving nut in chain lines, illustrating an intermediate position of the balls and the driving nut.
Figure 4:
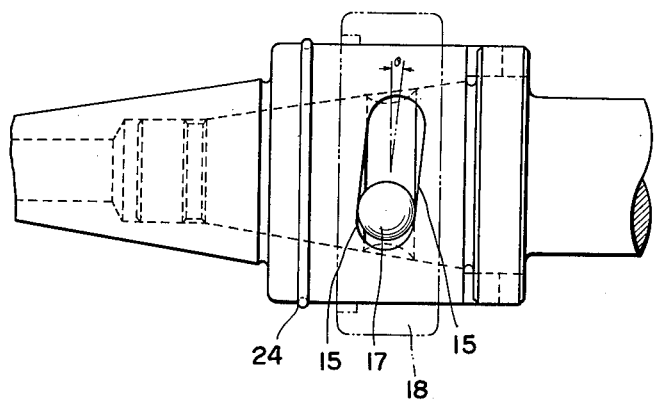
FIG. 4 is a side view similar to FIG. 3 illustrating the tool holder locked in the device.
Figure 5:
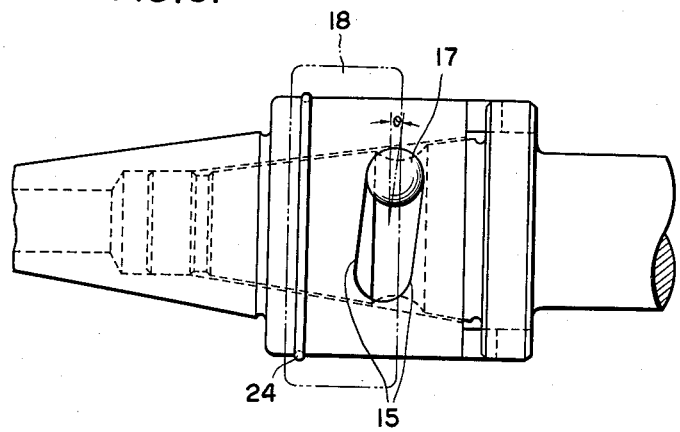
FIG. 5 is a side view similar to FIG. 3 illustrating the tool holder loosened and ready to be taken out.
Figure 6:
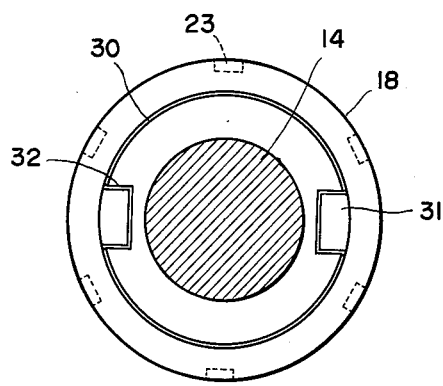
FIGS. 6 and 7 are the sectional views taken along lines B—B and A—A, respectively, of FIG. 1.

As shown in FIG. 3, FIG. 4 and FIG. 5, the balls 17 are rotatingly shifted in the direction of the axis of tool spindle 11 by the spiral slot 15 which is at an angle of $\theta°$ to the spindle, so that the balls will contact one edge 26 of a peripheral groove 27 provided on the tapered end 13 of the tool holder.

As best shown in FIG. 3 and FIG. 4, by rotating the balls 17 to the right by means of the driving nut 18, the balls will contact with the edge 26, on which a pressure is applied to force the tapered end 13 into the taper socket 12 for fixing the tool holder therein. Thus the driving member 11 and the tool holder 14 are joined and fixed and at the same time the driving connection is secured thereby.

By rotating the driving nut 18 to the left, the driving steel balls 17 are gradually shifted backwards by the spiral slot 15, which are at an angle of $\theta°$ to the spindle, and the balls move away from the edge 26 to allow the release of the tool holder 14. Prior to this invention, since the tapered end 13 was always pushed firmly into the taper socket 12, it was difficult to pull out the holder without a hammer or drift pin.

This invention provides a novel means to release the tool holder from its locked position. It may be observed that a pressure is applied through the driving balls 17 to the edge 28 of the peripheral groove 27 on the tapered end 13 by the co-operating action of the spiral slots 15 at an angle of $\theta°$ to the spindle and the driving steel balls 17, creating clearances between parts 11, 13 and 17, and thus the holder 14 is released. At that stage, the tool holder 14 will not drop by gravity as it is still held in place in a loosened state due to the contact of the balls 17 with the groove 27, and for taking the tool holder 14 completely out of the pocket, the driving nut 18 is moved to the position of the stop ring 24 and the force exerted on the balls by the tendency of the tool holder 14 to drop is changed into a force perpendicular to the axis, and this force pushes the driving balls 17 out into grooves 29, thus disengaging the tool holder 14 from the driving balls 17 and permitting an easy removal of the holder 14. The rotation angle of this driving nut 18 is about 50°.

Thus, merely by means of the members 15, 17 and 18, and by the rotating and sliding motion of the members 17 and 18, the tool holder 14 may be easily fixed, released and taken out. And by these means the tool holders may be replaced safely and promptly by a spindle or similar holding devide.

Another feature of this invention is the driving connection between the spindle 11 and the tool holder 14.

This driving connection is accomplished by a flange 30 and one or more driving projections 31 fixed to the end of the spindle member 11 which engage in grooves 31 of said flange 30, and as the projections 31 and grooves 32 are fixedly engaged to each other, even when a great driving force is applied, a complete driving connection is maintained without causing damage to members 17 and 26, since the driving diameter of parts 31 and 32 is larger than that of members 17 and 26.

From the above description it may be understood that the tapered socket connection may be made for a tool holding member or a tool itself having a tapered end adapted to fit into the tapered socket in the driving spindle or in another driving member, or may be made by other members with various shapes.

Figure 8:
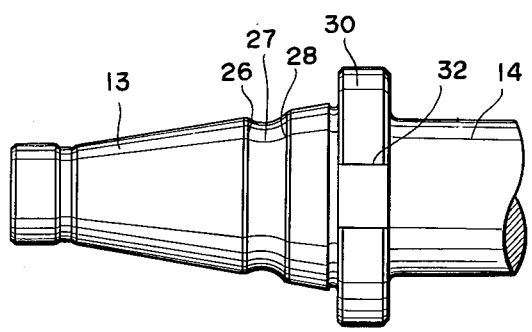
FIG. 8 is a side elevation view of the tool holder out of the spindle.
Figure 9:
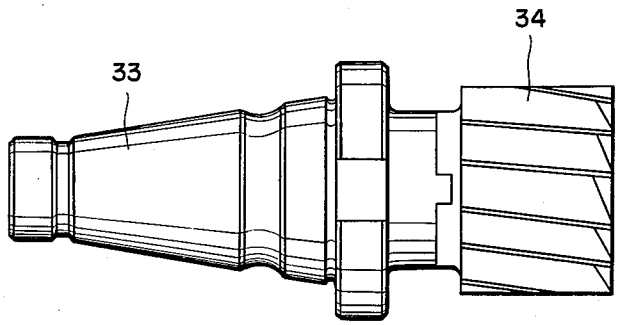
FIGS. 9 and 10 are side elevation views of the improved tool holder according to this invention illustrating examples of application of the invention to different types of tools.

In FIG. 9, an adapter 33 and a shell end mill 34 are shown as an example, wherein a shell end mill is attached to the tool holder 14 of FIG. 8.

Figure 10:
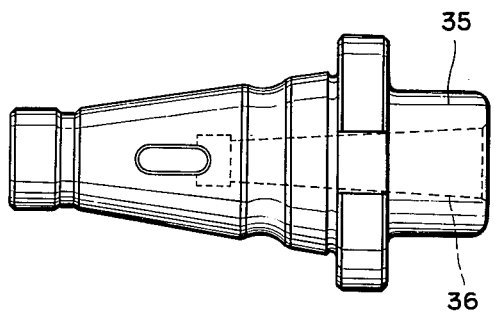

In FIG. 10, an adapter 35 having a tapered socket 36 to receive drills or reamers, etc. is shown.

Having thus described the invention, what is claimed as new and desired to be secured by Letters Patent is:

1. A tool holder for attaching a cutter tool or tool adapter to a main driving spindle or the like, comprising a driving member adapted to be mounted on a spindle and having a tapered socket therein, said driving member having spiral slots therein opening into said socket, driving balls rotatably mounted in said slots, a driving nut rotatably mounted on the outside of said driving member for movement axially of said driving member, said driving nut having grooves on the inner peripheral surface thereof in which said driving balls are engaged, and a tapered member adapted to form the end of a tool or a tool holder or the like, said tapered member being in said tapered socket and having an annular groove therein at a position opposed to said spiral slots for receiving said driving balls, whereby said tapered member can be fixed within said tapered socket by rotating and shifting said driving balls axially by rotating said driving nut in one direction and can be released from said tapered socket by rotating said driving nut in the opposite direction.

2. A tool holder as claimed in claim 1 in which said driving member has a stop means thereon with which said driving nut is engageable at the limit of its axial movement brought about by its rotation in said opposite direction, and said driving nut having the grooves in the inner peripheral surface deeper at the point opposed to said slots when said driving nut is engaged with said stop means, whereby said driving balls can be urged outwardly by a downward movement of said tapered member, said deeper grooves at said point being sufficiently deep to permit said member to be freely removed from said recess.

References Cited by the Examiner
UNITED STATES PATENTS

| | | | |
|---|---|---|---|
| 1,636,421 | 7/1927 | Knott | 279—75 |
| 1,781,442 | 11/1930 | Currier | 279—75 |
| 2,433,127 | 12/1947 | Kinzbach. | |

WILLIAM W. DYER, Jr., *Primary Examiner.*